United States Patent
Meyer et al.

(10) Patent No.: US 12,292,029 B2
(45) Date of Patent: May 6, 2025

(54) WIND TURBINE TOWER STRUCTURE WITH TRANSITION SYSTEM BETWEEN SECTIONS THEREOF

(71) Applicant: General Electric Company, Schenectady, NY (US)

(72) Inventors: Pascal Meyer, Burnt Hills, NY (US); Biao Fang, Clifton Park, NY (US); Norman Arnold Turnquist, Carlisle, NY (US); Xiaopeng Li, Niskayuna, NY (US); Gregory Edward Cooper, Greenfield Center, NY (US); Christopher James Kenny, Schoharie, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/015,595

(22) PCT Filed: Jul. 13, 2021

(86) PCT No.: PCT/US2021/041426
§ 371 (c)(1),
(2) Date: Jan. 11, 2023

(87) PCT Pub. No.: WO2023/287401
PCT Pub. Date: Jan. 19, 2023

(65) Prior Publication Data
US 2024/0240615 A1    Jul. 18, 2024

(51) Int. Cl.
*F03D 13/20* (2016.01)
*E04H 12/08* (2006.01)

(52) U.S. Cl.
CPC ......... *F03D 13/201* (2023.08); *E04H 12/085* (2013.01); *F05B 2240/912* (2013.01)

(58) Field of Classification Search
CPC .. F03D 13/201; F03D 13/20; F05B 2240/912; E04H 12/085; Y02E 10/72; Y02E 10/728
See application file for complete search history.

(56) References Cited

U.S. PATENT DOCUMENTS 7,694,473 B2    4/2010  Jakubowski et al.
9,175,670 B2 *  11/2015  Lockwood ............. F03D 13/20
(Continued)

FOREIGN PATENT DOCUMENTS

DE    10230273 B3    2/2004
EP    2807317 B1    12/2015
(Continued)

OTHER PUBLICATIONS

English Translation of WO 2019/193388 (Year: 2019).*
(Continued)

*Primary Examiner* — Andrew J Triggs
(74) *Attorney, Agent, or Firm* — Dority & Manning, P.A.

(57) ABSTRACT

A tower structure particularly suited for a wind turbine includes a lower tower section formed of concrete and an upper tower section formed of steel. A transition system connects the upper tower section to the lower tower section, the transition system including a concrete component having a tubular wall with a base portion fixed on the lower tower section and a head portion connected to the upper tower section. The head portion extends radially outward beyond the upper tower section. A plurality of first tensioning tendons extend longitudinally at least partially through the tubular wall and are anchored to the concrete component at a top face of the head portion at locations radially outward of the upper tower section.

20 Claims, 4 Drawing Sheets

(56) References Cited

U.S. PATENT DOCUMENTS

| | | | |
|---|---|---|---|
| 9,243,418 B2 | 1/2016 | Bogl et al. | |
| 10,138,648 B2 | 11/2018 | Zavitz et al. | |
| 10,954,686 B2 * | 3/2021 | Chase | E04H 12/16 |
| 11,415,106 B2 * | 8/2022 | Baun | E04H 12/20 |
| 2011/0138704 A1 * | 6/2011 | Bagepalli | E04H 12/16 |
| | | | 52/147 |
| 2016/0017868 A1 * | 1/2016 | Lockwood | F03D 13/20 |
| | | | 52/223.5 |
| 2019/0106856 A1 | 4/2019 | Lockwood et al. | |
| 2022/0034108 A1 | 2/2022 | Cooper et al. | |
| 2024/0240615 A1 * | 7/2024 | Meyer | E04H 12/085 |

FOREIGN PATENT DOCUMENTS

| | | |
|---|---|---|
| EP | 2744955 B1 | 1/2016 |
| ES | 2350135 B2 | 10/2012 |
| WO | WO2012/122976 A2 | 9/2012 |
| WO | WO2013/110448 A1 | 8/2013 |
| WO | WO2019/193388 A1 | 10/2019 |
| WO | WO2020/068122 A1 | 4/2020 |

OTHER PUBLICATIONS

PCT International Search Report & Opinion Corresponding to PCT/US2021/041426 on Mar. 21, 2022.

Rodrigues-Pires, Design of Concrete-Steel Transitions in a Hybrid Wind Turbine Tower, 2013, 82 Pages. Retrieved from weblink: Design_of_Concrete-Steel_Transitions_in_a_Hybrid_Wind_Turbine_Tower-Thesis.

* cited by examiner

WIND TURBINE TOWER STRUCTURE WITH TRANSITION SYSTEM BETWEEN SECTIONS THEREOF

STATEMENT REGARDING FEDERALLY SPONSORED RESEARCH OR DEVELOPMENT

This invention was made with Government support under Contract No. DE-EE0009059 awarded by the U.S. Department of Energy (DOE). The Government has certain rights in the invention.

RELATED APPLICATION

The present application claims priority to PCT Application Serial Number PCT/US2021/041426, filed on Jul. 13, 2021, which is incorporated by reference herein.

FIELD

The present disclosure relates in general to a tower structure for a wind turbine, and more particularly to a system for transitioning between a concrete base section of the tower and an upper steel section of the tower.

BACKGROUND

Renewable power is considered one of the cleanest, most environmentally friendly energy sources presently available, and power generating facilities which include renewable power assets have gained increased attention in this regard. One example of such a renewable power asset is a wind turbine. Modern wind power generation systems typically take the form of a wind farm having multiple such wind turbine generators that are operable to supply power to a transmission system providing power to an electrical grid.

As wind turbines continue to grow in size and production capacity, their respective tower structures must also evolve. Hybrid tower constructions have proven to be particularly beneficial in this regard, wherein a lower or base tower section is typically made of concrete and an upper tower section is made of steel. The concrete base section typically has an increased diameter for overall stability purposes. Hybrid towers offer benefits in terms of manufacturing costs, logistics (e.g., transportation of the tower to the site), ease of erecting the tower at the site, and so forth.

The connection of the upper steel tower section with the base concrete tower section is a critical consideration, particularly with respect to tensile stresses induced in the concrete at the connection point. Various transition assemblies have been proposed in the industry to address this issue.

For example, U.S. Pat. No. 9,243,418 proposes an adapter piece between the tower sections that consists of an annular concrete element with an upper annular steel flange that is cast with the concrete element. The steel element includes openings on the internal perimeter thereof through which tensioning cables are inserted and fastened to the flange. The cables extend through jacket tubes in the concrete element and run within the tubular concrete section of the tower.

U.S. Pat. No. 7,694,473 proposes a wind turbine tower having a tubular concrete base segment and an upper tubular steel segment. The concrete segment includes an integrally-formed head portion that accommodates anchor bolts therethrough for mounting a foot of the steel segment to the concrete segment. Prestressing cable elements run through a radially inward projecting portion of the head portion and extend within and to the base of the concrete segment.

DE 10230273 describes a connection piece between a lower tubular concrete part and an upper tubular steel part, the connection piece having a circular flange at the upper and lower ends of a vertical wall, the upper flange forming a T-shaped member. The tubular steel part of the tower is mounted to the radially inward flange component of the upper flange and tensioning tendons extend through the lower flange and are anchored to the radially outward flange component of the upper flange. The tendons run through sleeves in the wall of the lower tubular concrete part of the tower.

Thus, the art is continuously seeking new and improved transition systems for ever-larger towers, particularly wind turbine towers, wherein the transition systems effectively manage the induced stresses at the connection point between the tower segments.

BRIEF DESCRIPTION

Aspects and advantages of the invention will be set forth in part in the following description, or may be obvious from the description, or may be learned through practice of the invention.

In one aspect, the present disclosure is directed to a tower structure that is particularly well-suited as a wind turbine tower. It should be appreciated, however, that the tower structure is not limited to utilization with a wind turbine. The tower structure includes a lower tower section formed of concrete and an upper tower section formed of steel. A transition system connects the upper tower section to the lower tower section and includes a concrete component having a tubular wall with a base portion fixed on the lower tower section and a head portion connected to the upper tower section. The head portion extends radially outward beyond the upper tower section. A plurality of first tensioning tendons extend longitudinally at least partially through the tubular wall and are anchored to the concrete component at a top face of the head portion at locations radially outward of the upper tower section.

In a particular embodiment, the head portion of the concrete component extends radially outward beyond the base portion, with the first tensioning tendons extending longitudinally through the head portion and extending radially outward of the base portion and the lower tower section. With this embodiment, the concrete component may include a first angled face extending between the head portion and the base portion, wherein the first tensioning tendons extend through the first angled face to the top face of the head portion.

Certain embodiments may include connecting bolts embedded in the concrete component and extending from the top face of the head portion, wherein the upper tower section is bolted to the concrete component via the connecting bolts. The connecting bolts may be located radially inward of a circumferential wall of the upper tower section.

In other embodiments, a steel member may be provided between the top face of the head portion and the upper tower section, wherein the first tensioning tendons extending through the steel member. The steel member may be a ring member fixed to the top face of the head portion having passages or holes defined therein to accommodate passage of the tensioning tendons and connecting bolts. In another embodiment, the steel member may be a cylindrical member with a foot flange against the top face of the head portion and an opposite top flange, wherein the first tensioning tendons extending through and are anchored to the foot flange and the upper tower section is bolted to the top flange.

Still other embodiments of the tower structure may include a plurality of second tensioning tendons extending longitudinally at least partially through the tubular wall and anchored to the concrete component at the top face of the head portion at locations radially inward of the first tensioning tendons. With this embodiment, the head portion may extend radially inward from the base portion, wherein the anchor locations of the second tensioning tendons at the top face of the head portion are radially inward from a tubular wall of the lower tower section such that the second tensioning tendons extend within the lower tower section. This embodiment may also include a second angled face extending between the head portion and the base portion, with the second tensioning tendons extending through the second angled face to the top face of the head portion.

The concrete component of the transition system may be variously configured and manufactured. For example, the component may have a cylindrical-cross section base portion with the head portion extending radially outward from the base portion. The head portion may also extend radially inward of the base portion.

In an alternate embodiment that includes the first and second tensioning tendons, the head portion and the base portion of the concrete component may extend radially outward and radially inward from the lower tower section. For example, the concrete component may be formed as a constant-diameter or tapered-diameter cylinder wherein the outer and inner walls thereof extend radially outward and radially inward, respectively, relative to the lower tower section. The concrete component may include a plurality of channels defined in the outer wall thereof through which the first tensioning tendons run and a plurality of channels defined in the inner wall thereof through which the second tensioning tendons run. The channels may be closed (e.g., tunnels) or may be open along the longitudinal length thereof (e.g., grooves). With this embodiment, a steel member such as a plate or flange may be provided between the top face of the head portion and the upper tower section, wherein the first tensioning tendons and the second tensioning tendons extend through holes in the steel member aligned with the channels in the concrete component and are anchored to the concrete component (via the steel member) at the top face of the head portion.

In the various embodiments, one or both of the lower tower section and the concrete component are a 3-D printed concrete structure.

The present invention also encompasses a wind turbine that utilizes any one of the embodiments of the tower structure embodied herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
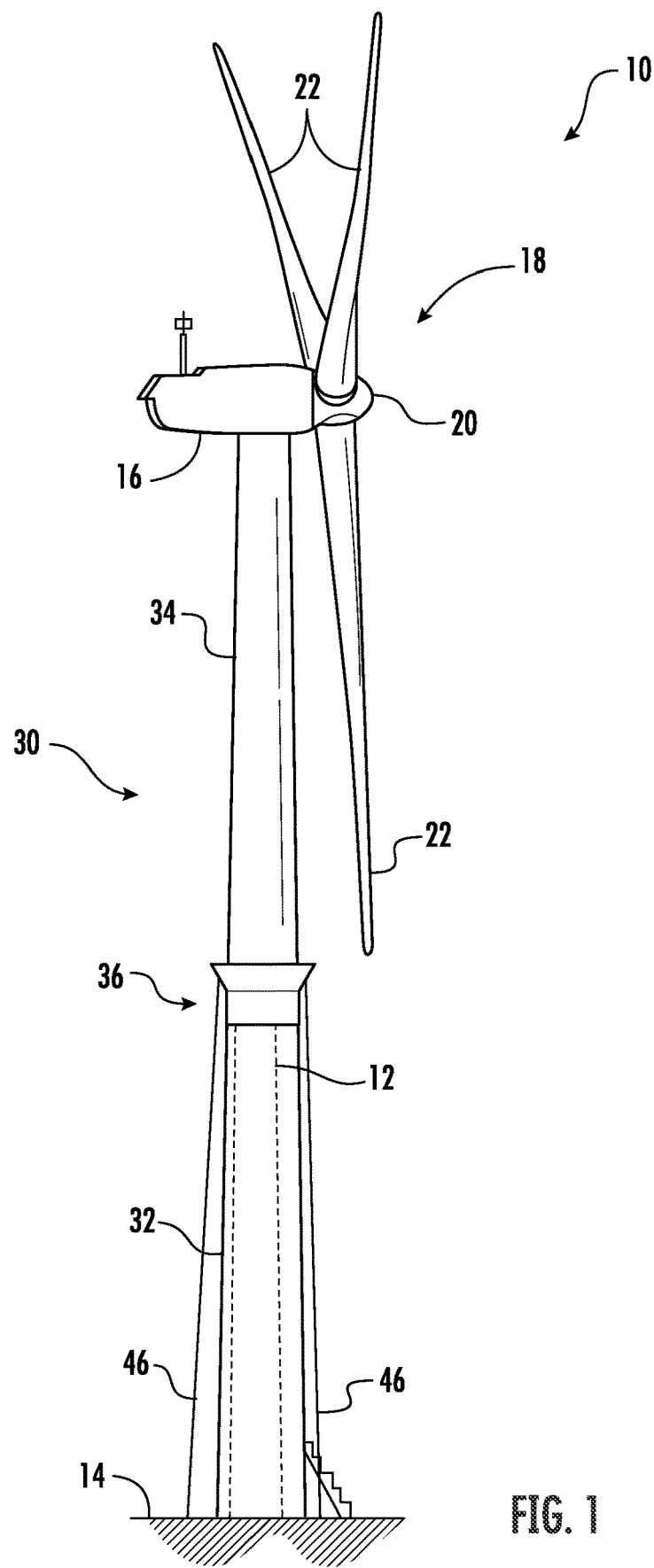
FIG. 1 depicts a wind turbine with a hybrid tower structure in accordance with aspects of the present invention.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled", "connected", "fixed", and the like, refer to both direct coupling, fixing, or attaching, as well as indirect coupling, fixing, or attaching through one or more intermediate components or features, unless otherwise specified herein.

As mentioned, the present disclosure is directed to an improved tower structure that is particularly well-suited for a wind turbine, but is not limited to such use. The tower structure is described herein for use with a wind turbine for illustrative purposes.

In this regard, referring to FIG. 1, an exemplary wind turbine 10 is depicted as a horizontal-axis wind turbine. Alternatively, the wind turbine 10 may be a vertical-axis wind turbine. The wind turbine 10 includes a tower 12 on a support system or base 14, a nacelle 16 mounted on the tower 12, and a rotor 18 that is coupled to the nacelle 16. The rotor 18 includes a rotatable hub 20 and at least one rotor blade 22 coupled to and extending outward from hub 20. The rotor blades 22 are spaced about the rotatable hub 20 to facilitate rotating the rotor 18. The rotating blades 22 drive a geartrain within the nacelle 16 that includes a gearbox connected to a generator to enable kinetic energy to be transferred from the wind into usable mechanical energy, and subsequently, electrical energy.

The tower 12 is a hybrid tower structure 30 formed from a lower tower section 32 that is typically made from concrete. In a particular embodiment according to the invention, the lower tower section 32 is formed in an additive manufacturing (i.e., 3-D printing) process. The tower structure 30 includes an upper tower section 34, which may be formed as a steel cylindrical or lattice-frame structure.

The tower structure 30 includes a transition system 36 to connect the upper tower section 34 to the lower tower section 32 in a manner that effectively manages and distributes the stresses, particularly tensile stresses, imparted to the lower concrete tower section 32. The transition system 36 is described in greater detail below.

The tower structure 30 includes a plurality of tension tendons 46, which may comprise cables or the like, connected around the transition system 36 and anchored to the base 14 around the bottom end of the lower tower section 32. The purpose and use of such tension tendons 46 with hybrid towers 12 is well-known in the field and need not be described in detail herein. In the embodiment depicted in FIG. 1, the tension tendons 46 are external to the tower 12. As described in greater detail below, embodiments of the invention may also include tension tendons 46 that are internal to the lower tower section 32.

Figure 2:
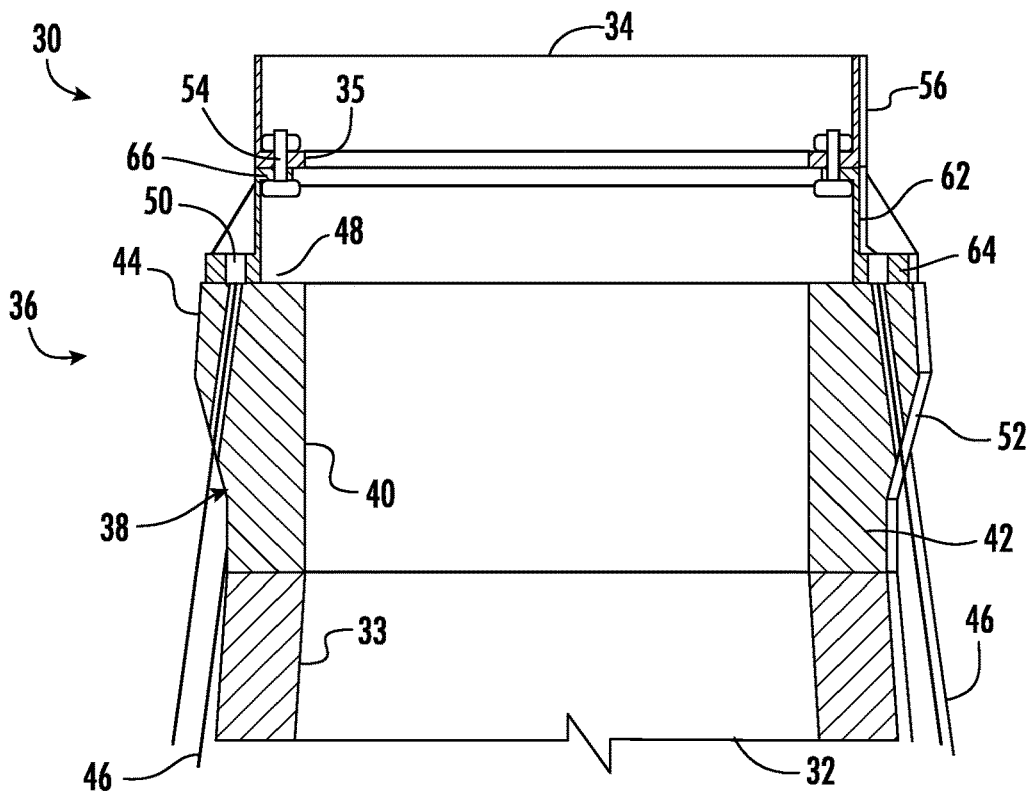
FIG. 2 is a cross sectional view of an embodiment of a tower structure and transition system in accordance with aspects of the present invention.
Figure 4:
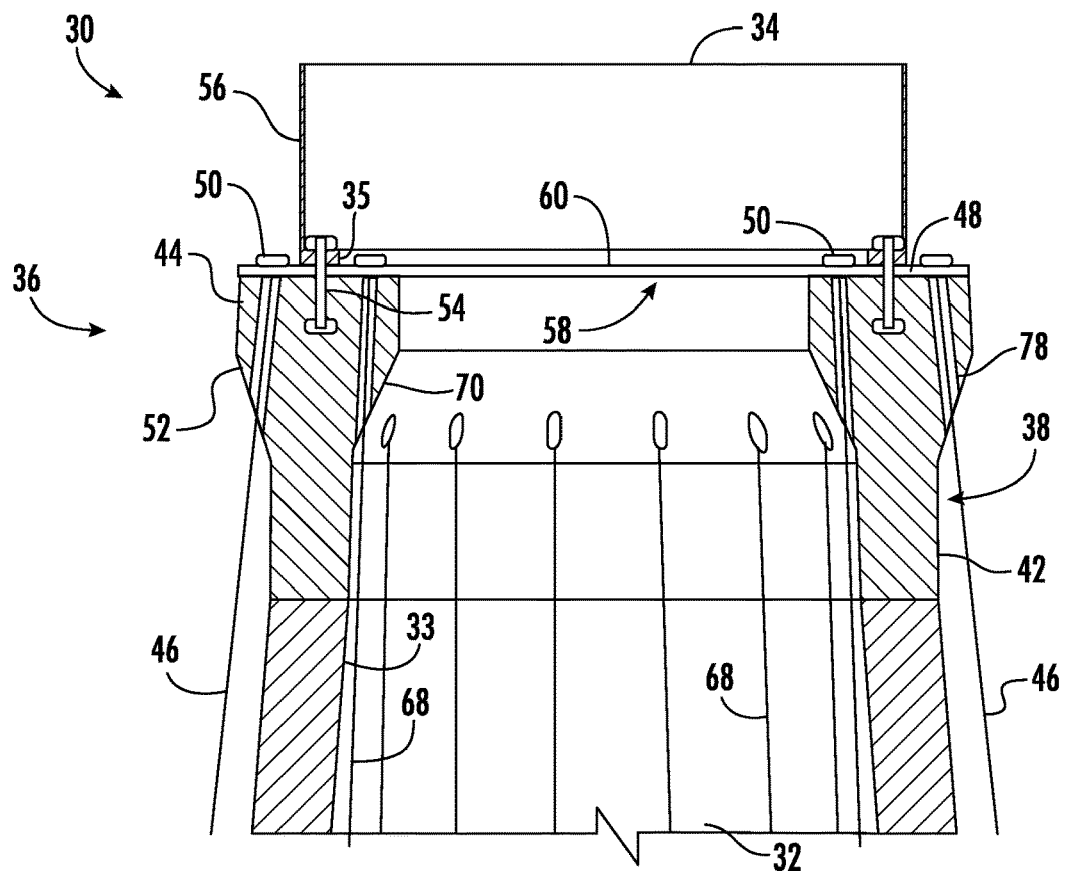
FIG. 4 is a cross sectional view of still a different embodiment of a tower structure and transition system.
Figure 5:
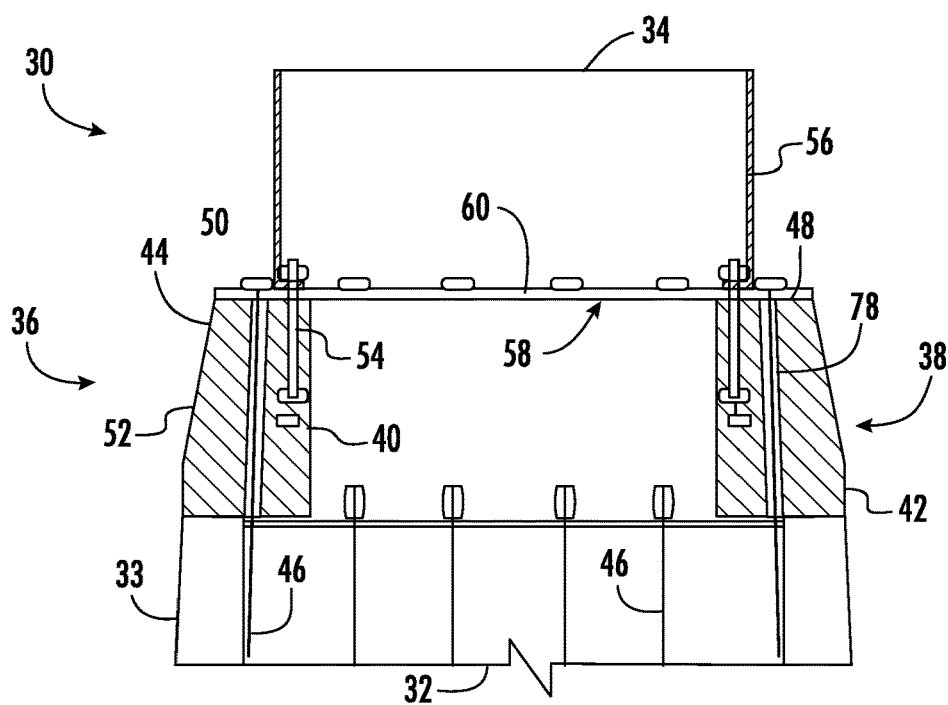
FIG. 5 is a cross sectional view of yet another embodiment of a tower structure and transition system.

Referring to FIG. 2, an embodiment of the transition system 36 is depicted connecting the upper tower section 32 with the lower tower section 34. The transition system 36 includes a concrete component 38 having a generally cylindrical shape defined by a tubular wall 40. The concrete component 38 has a base portion 42 towards the lower tower section 32, wherein and end face of the base portion 42 abuts a top end of the lower tower section 32. The base portion 42 may comprise a generally constant-diameter or tapered-diameter cylindrical section of the overall concrete component, as depicted in FIGS. 2, 4, and 5.

A head portion 44 of the concrete component 38 is towards the upper tower section 34. A top face 48 of the head portion 44 is mechanically connected to a bottom end of the top tower section 34 by way of, for example, connecting bolts 54 that extend through a flange 35 at the bottom of the upper tower section 34.

The concrete component 38 may be, for example, a poured (molded) concrete component or a 3-D printed concrete component.

Figure 3:
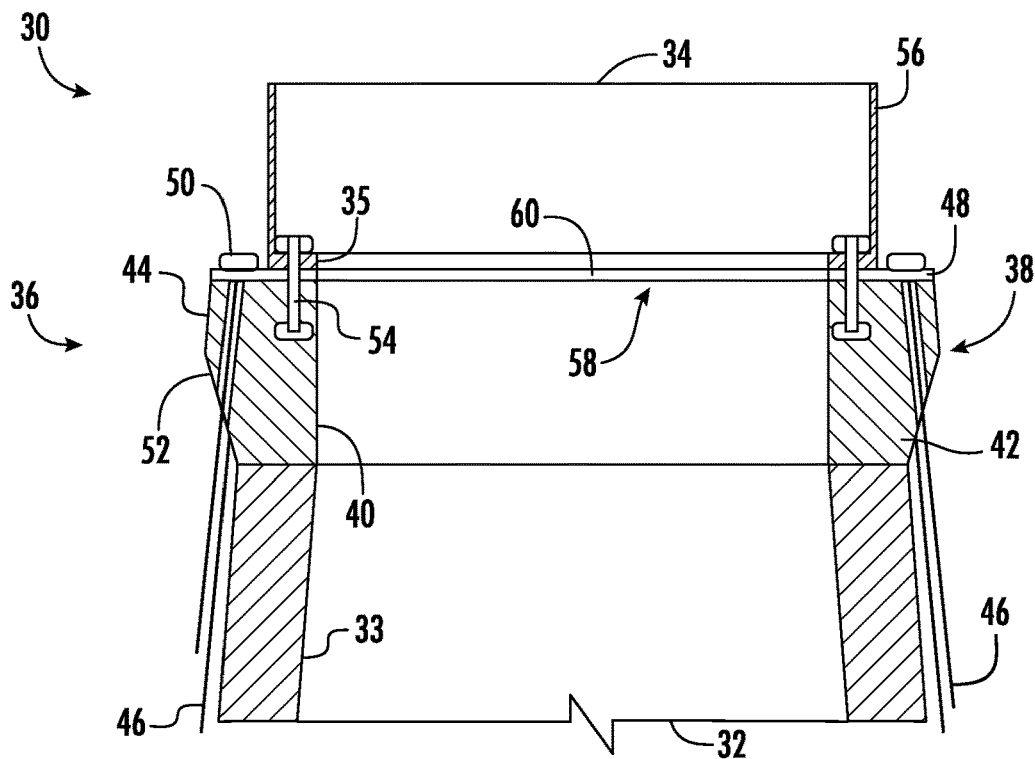
FIG. 3 is a cross sectional view of another embodiment of a tower structure and transition system.

As seen in FIGS. 2-3, the head portion 44 may extend radially outward beyond the upper tower section 34. In other words, the head portion 44 has a greater outer diameter (OD) than the OD of the upper tower section 34.

Still referring to FIGS. 2, a plurality of first tensioning tendons 46 extend longitudinally at least partially through the tubular wall 44. For example, the tendons 46 may extend through longitudinal bores or tunnels formed in the radially expanded head portion 44 (FIGS. 2-3), or may extend through sleeves 78 embedded in the head portion 44, as depicted in FIGS. 4-5. The first tensioning tendons 46 are anchored to the concrete component 38 at the top face 48 of the head portion 44 via any suitable manner of mechanical anchors 50 at locations radially outward of the upper tower section 34. As discussed above, the first tensioning members 46 are anchored at their opposite end to the base 14 of the tower structure 30 (FIG. 1).

In various embodiments depicted in the figures, the head portion 44 of the concrete component 38 also extends radially outward beyond the base portion 42 (FIGS. 2-4) and the first tensioning tendons 46 extend longitudinally through the head portion 44 and extend radially outward of the base portion 42 as well as the lower tower section 32. In these embodiments, a first angled face 52 may extend between the head portion 44 and the base portion 42, wherein the first tensioning tendons 46 extend through the first angled face 52 to the top face 48 of the head portion 44. As seen in FIGS. 2-4, the base portion 42 in these embodiments may have an OD that essentially equals the OD of the top of the lower tower section 32.

Referring to the embodiments of FIGS. 3-6, the connecting bolts 54 may be embedded in the concrete component 38 so as to extend upwardly from the top face 48 of the head portion 44. The exposed part of the connecting bolts 54 may extend through or into the flange 35 on the upper tower section 34. In various embodiments, the connecting bolts 54 are radially inward of a circumferential wall 56 of the upper tower section 34. For example, as depicted in the figures, the flange 35 at the base of the upper tower section 34 may be inwardly directed such that the connecting bolts 54 extend into the interior of the upper tower section 34.

Various embodiments may include a steel member 58 between the top face 48 of the head portion 44 and the upper tower section 34, wherein the first tensioning tendons 46 extend through the steel member and are secured with anchors 50 atop the steel member 58. The steel member 58 may be grouted to the upper face 48 of the head portion 44.

In the embodiments of FIGS. 3-6, the steel member 58 is defined by a ring member 60 fixed to the top face 48 of the head portion. Holes are defined in the ring member 60 that align with the connecting bolts 54 and the tensioning tendons 46.

In an alternate embodiment depicted in FIG. 2, the steel member 58 is formed as cylindrical member 62 with a foot flange 64 against the top face 48 of the head portion 44 and an opposite top flange 66. The first tensioning tendons 46 extend through the foot flange 64 and the upper tower section 34 (e.g., the flange 35 thereof) is bolted to the top flange 66.

Referring to the embodiment of FIG. 4, the tower structure 30 may include a plurality of second tensioning tendons 68 running longitudinally at least partially through the tubular wall 40 of the concrete component 38 (e.g., through the angled face 52 and radially expanded head portion 44) and anchored at the top face 48 of the head portion 44 at locations radially inward of the first tensioning tendons 46. In this embodiment, the head portion 44 also extends radially inward from the base portion 42 and the inside diameter (ID) of the lower tower section 32 and the anchor locations 50 of the second tensioning tendons 68 are at the top face 48 of the head portion 44 that is radially inward from the ID of the lower tower section 32. With this configuration, the second tensioning tendons 68 extend within (i.e. inside of) the lower tower section 32 and are anchored to the tower base 14 (FIG. 1) at locations inside of the tower structure 30.

Still referring to FIG. 4, an inner, second angled face 70 may be defined in the concrete component 38 between the radially inward section of the head portion 44 and the base portion 42, wherein the second tensioning tendons 68 extend longitudinally through the second angled face 70 and head portion 44 to the top face 48 of the head portion.

Figure 6:
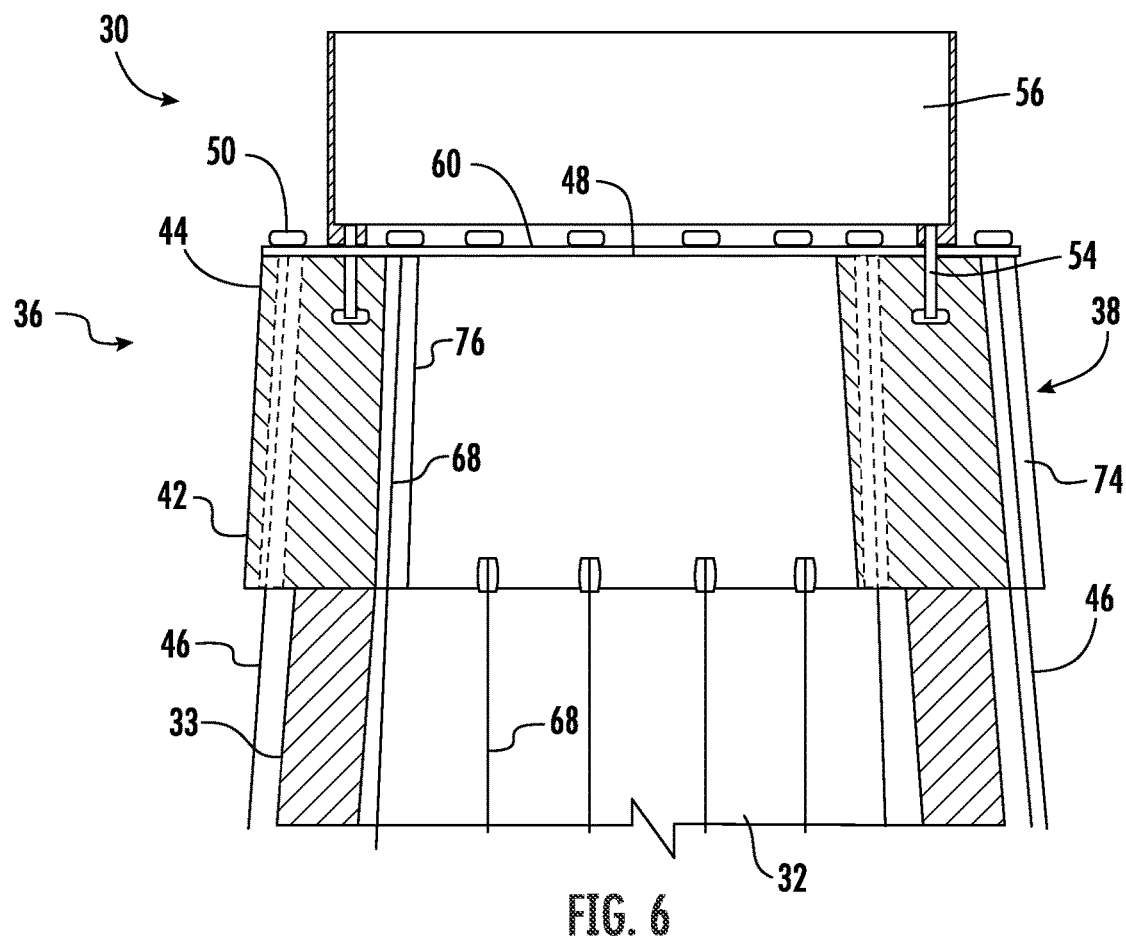
FIG. 6 is a cross sectional view of a different embodiment of a tower structure and transition system.
Figures 7A, 7B:
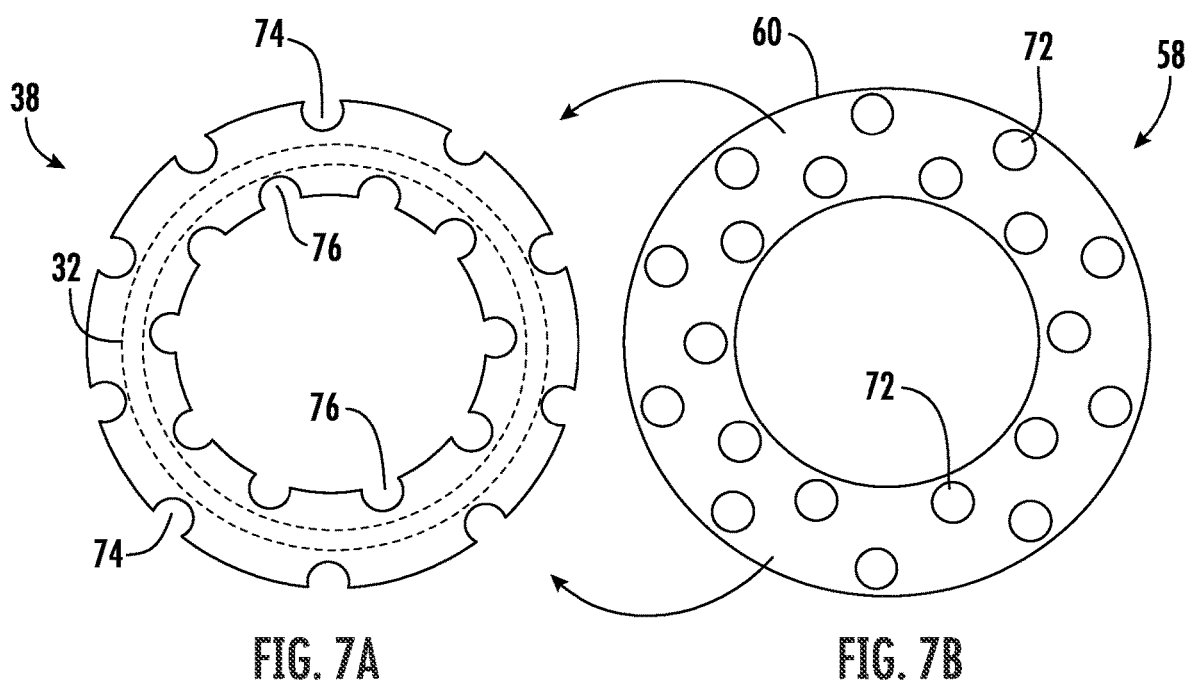
FIG. 7A is a top view of a concrete component having inner and outer open channels in accordance with an embodiment of the present invention.
FIG. 7B is a top view of a steel member in the form of a plate that may be used with the concrete component of FIG. 6A.

FIGS. 6, 7A, and 7B relate to another embodiment wherein the head portion 44 and the base portion 42 extend radially outward and radially inward from the lower tower section 32. In this embodiment, the concrete component 38 may be a tubular member with a generally cylindrical or trapezoidal shape. A plurality of longitudinally extending channels 74 are defined in an outer wall of the concrete component 38 through which the first tensioning tendons 46 run. A plurality of channels 76 are defined in an inner wall of the concrete component through which the second tensioning tendons 68 run. The channels 74, 76 may be open along the length thereof as depicted particularly in FIG. 7A and may be defined, for example, by grooves that are formed in the inner and outer walls of the concrete component. In another embodiment, the inner and outer walls may have a sine-wave configuration wherein the valleys such configuration define the channels 74, 76.

Referring to FIG. 7B, the steel member 58 may be defined by the plate 60 having holes 72 that align with the top of the channels 74, 76, wherein the first tensioning tendons 46 and the second tensioning tendons 68 pass through the holes 72 and are anchored to the concrete component 38 at the top face 48 of the head portion 44.

In the various embodiments, the concrete component 38 may be a tubular member with a constant diameter or tapered diameter longitudinal cross-sectional profile.

Also, one or both of the lower tower section 32 and the concrete component 38 are a 3-D printed concrete structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A tower structure, comprising: a lower tower section formed of concrete: an upper tower section formed of steel; a transition system connecting the upper tower section to the lower tower section, the transition system comprising: a concrete component having a tubular wall with a base portion fixed on the lower tower section and a head portion connected to the upper tower section; the head portion extending radially outward beyond the upper tower section: a plurality of first tensioning tendons extending longitudinally at least partially through the tubular wall; and the first tensioning tendons anchored to the concrete component at a top face of the head portion at locations radially outward of the upper tower section.

Clause 2: The tower structure of clause 1, wherein the head portion of the concrete component extends radially outward beyond the base portion, the first tensioning tendons extending longitudinally through the head portion and extending radially outward of the base portion and the lower tower section.

Clause 3: The tower structure of any preceding clause, further comprising a first angled face extending between the head portion and the base portion, the first tensioning tendons extending through the first angled face to the top face of the head portion.

Clause 4: The tower structure of any preceding clause, further comprising connecting bolts embedded in the concrete component and extending from the top face of the head portion, the upper tower section bolted to the concrete component via the connecting bolts.

Clause 5: The tower structure of any preceding clause, wherein the connecting bolts are radially inward of a circumferential wall of the upper tower section.

Clause 6: The tower structure of any preceding clause, further comprising a steel member between the top face of the head portion and the upper tower section, the first tensioning tendons extending through the steel member.

Clause 7: The tower structure of any preceding clause, wherein the steel member comprises a ring member fixed to the top face of the head portion.

Clause 8: The tower structure of any preceding clause, wherein the steel member comprises a cylindrical member with a foot flange against the top face of the head portion and an opposite top flange, the first tensioning tendons extending through the foot flange and the upper tower section bolted to the top flange.

Clause 9: The tower structure of any preceding clause, further comprising a plurality of second tensioning tendons running longitudinally at least partially through the tubular wall and anchored to the concrete component at the top face of the head portion at locations radially inward of the first tensioning tendons.

Clause 10: The tower structure of any preceding clause, wherein the head portion extends radially inward from the base portion, the anchor locations of the second tensioning tendons at the top face of the head portion being radially inward from a tubular wall of the lower tower section such that the second tensioning tendons extend within the lower tower section.

Clause 11: The tower structure of any preceding clause, further comprising a second angled face extending between the head portion and the base portion, the second tensioning tendons extending through the second angled face to the top face of the head portion.

Clause 12: The tower structure of any preceding clause, wherein the head portion of the concrete component extends radially outward beyond the base portion and radially inward from the base portion, the concrete component comprising an outer angled face extending between the base portion and the head portion and an opposite inner angled face extending between the head portion and the base portion, the first tensioning tendons extending longitudinally through the head portion and the outer angled face radially outward of the base portion and the lower tower section, and further comprising a plurality of second tensioning tendons extending longitudinally through the head portion and the inner angled face radially inward of the base portion and within the lower tower section.

Clause 13: The tower structure of any preceding clause, wherein the base portion of the concrete component comprises a cylindrical cross-section along a longitudinal length thereof.

Clause 14: The tower structure of any preceding clause, wherein the head portion and the base portion extend radially outward and radially inward from the lower tower section, and further comprising a plurality of channels defined in an outer wall of the concrete component through which the first tensioning tendons run and a plurality of channels defined in an inner wall of the concrete component through which the second tensioning tendons run.

Clause 15: The tower structure of any preceding clause, wherein the channels are open along a longitudinal length thereof.

Clause 16: The tower structure of any preceding clause, further comprising a steel member between the top face of the head portion and the upper tower section, the first tensioning tendons and the second tensioning tendons extending through holes in the steel member and anchored to the concrete component at the top face of the head portion.

Clause 17: The tower structure of any preceding clause, wherein the concrete component comprises one of a constant diameter or tapered diameter longitudinal cross-sectional profile.

Clause 18: The tower structure of any preceding clause, wherein one or both of the lower tower section and the concrete component are a 3-D printed concrete structure.

Clause 19: The tower structure of any preceding clause, wherein the tower structure is a wind turbine tower.

Clause 20: A wind turbine, comprising the tower structure of any preceding clause.

What is claimed is:

1. A tower structure, comprising:
   a lower tower section formed of concrete;
   an upper tower section formed of steel;
   a transition system connecting the upper tower section to the lower tower section, the transition system comprising:
      a concrete component having a tubular wall with a base portion fixed on the lower tower section and a head portion connected to the upper tower section;
      the head portion extending radially outward beyond the upper tower section; a plurality of first tensioning tendons extending longitudinally at least partially through the tubular wall;
      the first tensioning tendons anchored to the concrete component at a top face of the head portion at locations radially outward of the upper tower section; and
      the head portion extending radially inward from the base portion.

2. The tower structure of claim 1, wherein the head portion of the concrete component extends radially outward beyond the base portion, the first tensioning tendons extending longitudinally through the head portion and extending radially outward of the base portion and the lower tower section.

3. The tower structure of claim 2, further comprising a first angled face extending between the head portion and the base portion, the first tensioning tendons extending through the first angled face to the top face of the head portion.

4. The tower structure of claim 1, further comprising connecting bolts embedded in the concrete component and extending from the top face of the head portion, the upper tower section bolted to the concrete component via the connecting bolts.

5. The tower structure of claim 4, wherein the connecting bolts are radially inward of a circumferential wall of the upper tower section.

6. The tower structure of claim 4, further comprising a steel member between the top face of the head portion and the upper tower section, the first tensioning tendons extending through the steel member.

7. The tower structure of claim 6, wherein the steel member comprises a ring member fixed to the top face of the head portion.

8. The tower structure of claim 6, wherein the steel member comprises a cylindrical member with a foot flange against the top face of the head portion and an opposite top flange, the first tensioning tendons extending through the foot flange and the upper tower section bolted to the top flange.

9. The tower structure of claim 1, further comprising a plurality of second tensioning tendons running longitudinally at least partially through the tubular wall and anchored to the concrete component at the top face of the head portion at locations radially inward of the first tensioning tendons.

10. The tower structure of claim 9, wherein the anchor locations of the second tensioning tendons at the top face of the head portion are radially inward from a tubular wall of the lower tower section such that the second tensioning tendons extend within the lower tower section.

11. The tower structure of claim 10, further comprising a second angled face extending between the head portion and the base portion, the second tensioning tendons extending through the second angled face to the top face of the head portion.

12. The tower structure of claim 9, wherein the head portion and the base portion extend radially outward and radially inward from the lower tower section, and further comprising a plurality of channels defined in an outer wall of the concrete component through which the first tensioning tendons run and a plurality of channels defined in an inner wall of the concrete component through which the second tensioning tendons run.

13. The tower structure of claim 12, wherein the channels are open along a longitudinal length thereof.

14. The tower structure of claim 12, further comprising a steel member between the top face of the head portion and the upper tower section, the first tensioning tendons and the second tensioning tendons extending through holes in the steel member and anchored to the concrete component at the top face of the head portion.

15. The tower structure of claim 12, wherein the concrete component comprises one of a constant diameter or tapered diameter longitudinal cross-sectional profile.

16. The tower structure of claim 1, wherein the head portion of the concrete component extends radially outward beyond the base portion, the concrete component comprising an outer angled face extending between the base portion and the head portion and an opposite inner angled face extending between the head portion and the base portion, the first tensioning tendons extending longitudinally through the head portion and the outer angled face radially outward of the base portion and the lower tower section, and further comprising a plurality of second tensioning tendons extending longitudinally through the head portion and the inner angled face radially inward of the base portion and within the lower tower section.

17. The tower structure of claim 16, wherein the base portion of the concrete component comprises a cylindrical cross-section along a longitudinal length thereof.

18. The tower structure of claim 1, wherein one or both of the lower tower section and the concrete component are a 3-D printed concrete structure.

19. The tower structure of claim 1, wherein the tower structure is a wind turbine tower.

20. A wind turbine, comprising the tower structure of claim 1.

* * * * *